3,300,375
PROCESS WATER TREATMENT AND METHOD OF CONTROLLING SULFATE-REDUCING BACTERIA
Donald Clifford Wehner, Fairfield, Conn., assignor to American Cyanamid Company, Stamford, Conn., a corporation of Maine
No Drawing. Filed Aug. 10, 1965, Ser. No. 478,741
8 Claims. (Cl. 167—22)

This application is a continuation-in-part application of Serial No. 142,760, filed October 4, 1961, now abandoned.

This invention relates to methods of inhibiting the growth of sulfate reducing bacteria and, particularly, methods of eliminating from process water the odor, plugging, and corrosive tendencies resulting from the presence of sulfate reducing bacteria.

An acute problem in the storage and utilization of industrial process water is the fouling of such water and systems in which the water is used by the growth of sulfate reducing bacteria. These bacteria are anaerobic, i.e., they can thrive in the absence of free oxygen, and are described as sulfate reducing since in their life metabolism they reduce the sulfate ion found in most waters to hydrogen sulfide. Moreover, these bacteria are resistant or develop resistance to many bacteriostatic and bactericidal agents. Frequently, sulfate reducing bacteria multiply so rapidly, particularly under moist, humid conditions and in a saline environment, that the concentration of known bactericides, e.g., chlorine, required for control becomes so high as itself to cause corrosion of unprotected steel equipment.

The sulfate reducing bacteria generally include the species *Desulfovibrio desulfuricans, Desulfovibrio orientis, Clostridium nigrificans*. Of these, the first is most prevalent.

By "process water" is meant fresh water, slightly saline water, sea water, or concentrated brines, which are utilized in or result from various industrial treatments and which because of their source, mode of storage or utilization, operate as culture media for sulfate reducing bacteria.

Typical industrial systems employing process water are paper mills, cooling towers used in connection with heat exchange systems, metallurgical operations employing cutting oils, latex paint preparation and storage, oil production including subsurface disposal of water withdrawn from wells and water used to repressurize wells for secondary oil recovery, packing fluids employed as "dead" layers in the casings of "multiple completion" oil well systems, and neutral drilling mud systems. In general, any process water which remains quiescent or under reduced rate of flow is subject to growth of sulfate reducing bacteria.

The harmful effects of growth of these bacteria are enormous. In oil production, for example, the bacteria cause injection well plugging and corrosion of iron and steel pipes and equipment, necessitating expensive shutdown for cleaning. Using the oil as their carbon source, the bacteria reduce sulfate ion to hydrogen sulfide ("sour gas") which in turn reacts with iron to form black particles of suspended iron sulfide. These particles clog the injection system and the once water-permeable oil-bearing formations. The bacteria are often the sole cause of pitting type corrosion of drilling equipment, either by acting as cathode depolarizers or by producing corrosive hydrogen sulfide, but more often they accelerate corrosion. See A. W. Baumgartner, "Sulfate-Reducing Bacteria . . . Their Role in Corrosion and Well Plugging," presentation at West Texas Oil Lifting Short Course, Texas Technological College, Lubbock, Texas, April 21-22, 1960.

Saline water, e.g., brine or sea water, is commonly employed in primary and secondary oil recovery and as a packing fluid in multiple completion oil wells, particularly in coastal areas. Saline water, however, greatly limits the choice of bactericidal agents effective against sulfate reducing bacteria since many of such agents, e.g., amines, quaternary compounds, imidazolines, precipitate out in salt solutions. Others, e.g., silver and mercury compounds, such as phenyl mercuric acetate, are precipitated by the sulfides resulting from the metabolism of the bacteria.

The problem of effective bactericides in brine systems is further complicated by the fact that saline solutions encourage bacterial growth by removing constituents deleterious to bacterial growth.

In paper mills, collection of "black spots" (iron sulfides) in the bottom of tanks or slow sections of lines can seriously lower the quality of the paper product. In metallurgical operations, shutdown of a plant over a weekend, for example, has permitted the growth of sulfate reducing bacteria in cutting oil tanks, causing unbearable odors of hydrogen sulfide and loss of production time while the cutting oils are replaced and tanks cleaned.

Several requirements for usefulness of a bactericide against sulfate reducing bacteria in the process water must be met. Thus, the antibacterial agent must not only rapidly and effectively inhibit growth of sulfate reducing bacteria, but control must be effective at economically low concentrations. Additionally, the compound must be compatible with the process water. In particular, it should not salt out in brine solutions or react with other constituents so as to promote plugging. Nor should it coat the filters used, for example, to separate secondary oil from waterfloods. The antibacterial agent must be non-toxic both to personnel and to livestock which may drink from reservoirs. An finally, the agent remaining in the oil separated from waterfloods must not poison the cracking catalysts employed in refining oil.

The unpredictability of activity of compounds against sulfate reducing bacteria is well known. For example, a wide variation in activity against the same and different sulfate reducing bacterial strains has been noted for imidazolines, quaternaries, chlorinated phenols, amines and glutaraldehyde and hence it was not possible to predict the activity of one bactericide from knowledge of activity of another bactericide. See, for example, "Sulfate Reducing Bacteria: Their Relation to the Secondary Recovery of Oil," Science Symposium, St. Bonaventure University, October 23-24, 1957, particularly page 64.

In accordance with the present invention a method is provided for inhibiting the growth of sulfate reducing bacteria, and the consequent fouling of process water containing said bacteria, which comprises contacting said bacteria with an effective amount of a compound selected from the group consisting of methylene bisthiocyanate and monohalomethyl thiocyanate.

The monohalomethyl thiocyanates include monochloromethyl thiocyanate, monobromomethyl thiocyanate, monoiodomethyl thiocyanate, and monofluoromethyl thiocyanate.

The amount of compound for effective control will depend on the particular system in which the process water is employed. About 20 p.p.m. or less in the water of cooling towers will be effective. Oil well brines used in oil recovery require in the order of 25 p.p.m. or less. Neutral drilling muds are protected against growth of sulfate reducing bacteria by about 50 p.p.m. or less of one of the compounds. Amounts of 150 p.p.m. less in cutting oils effectively prevent spoilage and offensive odors therein. Generally, the compounds are effective in quantities of the order of about 0.25 to 10,000 p.p.m.

The thiocyanate compounds of the invention may be added directly to the process water in any suitable tank.

However, even though the maximum concentrations used are small, the volumes are large and uniform mixing is highly desirable. Direct addition, though simple, is not usually wholly satisfactory. Accordingly, the most useful mode of addition is to prepare a relatively smaller but more concentrated solution than the final dilution desired. This solution can then be metered by a proportioning pump or its equivalent into a suitably agitated tank or flow of water as the latter is being pumped to the point of use. Normal turbulent flow in the conduit produces adequate mixing. In this way, accurate dosages can be supplied and uniform dilutions obtained.

If desired, any of the numerous well known additives may be employed with the organic thiocyanates provided they are compatible therewith. Since methylene bisthiocyanate is solid, it may be useful to aid dispersion of the compound by addition of conventional surfactants in order to prepare concentrated suspensions or emulsions, aqueous or nonaqueous, prior to addition to the process water. Suitable dispersions may be prepared by agitating the finely divided solid or alcoholic solution thereof in the presence of a surfactant such as sodium lauryl sulfate, aliphatic and aromatic sulfonates, e.g., sulfonated castor oil, or various alkaryl sulfonates, e.g., the sodium salt of mono sulfonated nonyl naphthalene. Non-ionic types of emulsifying agents such as the higher molecular weight alkyl polyglycol ethers and analogous thio ethers such as the decyl, dodecyl and tetradecyl polyglycol ethers and thio ethers containing from about 25 to 75 carbon atoms may be used. The concentration of surfactant in the final emulsion should be sufficient to make the oil and water phases readily dispersible. For purposes of forming a spray emulsion, from about 0.02 to 3% of the surfactant will be effective. In general, formulations containing a surface active agent in the amount of from 1 to 20% by weight of active ingredient are satisfactory although such proportion may be varied over a wide range of proportions depending upon the particular circumstances.

In the case where cationic emulsifiers such as alkyl trimethyl ammonium chloride are employed, it is desirous that they be used in combination with a buffering agent to insure that the pH of the liquid being treated does not rise above about pH 8.5 at which point the active ingredient may be impaired by degradation.

Adjuvants such as wetting agents or humectants may, if desired, be employed particularly when compounding an aqueous dispersion. Examples of humectants are glycerine, diethylene glycol, polyethylene glycol and the like.

For many applications, the monohalomethyl thiocyanates are the preferred sulfate reducing bactericides since these compounds are liquids and therefore more readily soluble in the process waters than in methylene bisthiocyanate, a solid. However, the activity of all these bactericides is substantially equivalent. This is surprising since $CH_3SCN$, lacking a second thiocyanate group, and $CH_2Cl_2$, lacking a thiocyanate group but having two halogen substitutents, are each quite inactive against sulfate reducing bacteria. In view of this knowledge, it might have been expected that monohalomethyl thiocyanate, $ClCH_2SCN$ in particular, would only be half as effective as $CH_2(SCN)_2$ since activity appears to be a function of the thiocyanate radical. The equivalent activity observed therefore evidences the unobviousness of the invention.

In order that the present invention may be more completely understood, the following examples are given in which all parts and percentages are by weight unless otherwise specified. These examples are set forth primarily for the purpose of illustration and any specific enumeration of detail contained therein should not be interpreted as a limitation on the case except where indicated in the appended claims.

Example 1

The effectiveness of methylene bisthiocyanate against *Desulfovibrio desulfricans*, such as thrive in the water or brine employed as water floods in oils to achieve secondary recovery of petroleum or to repressurize oil wells, is demonstrated by the following controlled test.

A suitable sulfate reducing bacterial medium is prepared having the following composition:

| | | |
|---|---|---|
| Sodium lactate, U.S.P. | ml | 4.0 |
| Yeast extract | g | 1.0 |
| Ascorbic acid | g | 0.1 |
| $M_gSO_4 \cdot 7H_2O$ | g | 0.2 |
| $K_2HPO_4$ (anhyd.) | g | 0.01 |
| $Fe(SO_4)_2 \cdot (NH_4)_2 \cdot 6H_2O$* | g | 0.1 |
| NaCl | g | 10.0 |
| Distilled water | ml | 1000 |

*Added after sterilization.

All the ingredients except the iron compound are dissolved in the water by gentle heating with constant stirring and the pH is adjusted to 7.5 with NaOH. If necessary the medium is then filtered. It is then autoclaved at 15 lbs. steam pressure for 10 minutes, cooled slightly and the iron salt added. After cooling, the medium is inoculated by adding ten ml. of inoculum to each liter of medium. The inoculum should be from the third successive 24 hour transfer of an actively growing culture of the sulfate reducing bacteria.

"Mid-Continent Strain A—Texas Company" has been designated by the A.P.I. as the test culture of sulfate reducing bacteria to be used for compartive screening of chemicals. This culture is available from the University of Texas, Department of Bacteriology, at Austin, Texas. It can be carried on the above-described medium after adding 0.3% of agar.

The methylene bisthiocyanate employed as the bactericide in this example is preferably dissolved first in a carrier such as methyl alcohol to facilitate use. Aliquots of the bacterial medium and culture are added to a number of clear glass bottles some of which contain the antimicrobial agent. The bottles are incubated at 35° C. The growth of sulfate reducing bacteria in the various bottles is indicated by an intense blackening of the medium while containers having sufficient methylene bisthiocyanate to inhibit growth will remain clear for at least three weeks after the controls have turned black.

Example 2

An industrial cutting oil containing 9% of a hydrocarbon oil of low viscosity in a solution of 1% sodium petroleum sulfonate, 0.3% sodium naphthenate, 0.1% ethanol and 98.6% of water is prepared. Quantities corresponding to 0.01% and 0.5% of methylene bisthiocyanate based on the weight of the emulsion are found to inhibit the growth of sulfate reducing bacteria therein.

Example 3

A typical formulation containing an antimicrobial agent of the invention useful in treating water systems of the types employed in secondary oil recovery and industrial cooling systems is the following:

| Ingredient: | Percent by weight |
|---|---|
| Methylene bisthiocyanate | 50 |
| Isopropanol | 24 |
| Nonionic wetting agent | 1 |
| Water | 25 |

Addition of 10 p.p.m. of the above formulation to a brine such as that used in oil well treatment and secondary oil recovery destroys *Desulfovibrio desulfuricans* bacteria and prevents the formation of $H_2S$ and resultant corrosion in the system as well as plugging of the tubing and pipe lines.

Example 4

Further tests are conducted to determine the effectiveness of the organic thiocyanates against sulfate reducing bacteria. The tests are those developed by the American Petroleum Institute, Recommended Practice No. 38, as substantially indicative of the effectiveness of the toxicant were it used to control the growth of sulfate reducing bacteria in the waterfloods resulting from, or used in, secondary oil recovery. These tests are typical bacteriostatic broth dilution tests in which suitable dilutions of the toxicant are prepared and aliquots placed in bottles or test tubes. These containers together with suitable controls are the nearly filled with the A.P.I. recommended nutrient medium containing inoculum of test organism. The containers are then tightly stoppered to prevent entrance of oxygen and incubated for 21 days (in the case of Desulfovibrio) or 7 days (in the case of Clostridium). The test dilutions containing the latter species of bacteria are slight modifications of the A.P.I. recommended practice in that 1% peptone is added to the medium. Growth of the test organisms is evident by intense blackening caused by iron sulfide production of actively growing cultures.

Table I below reports the lowest concentration of toxicant expressed in p.p.m. which inhibited the growth of these organisms. MBT is methylene bisthiocyanate and CMT is monochloromethyl thiocyanate.

TABLE I

|  | MBT | CMT |
|---|---|---|
| Desulfovibrio desulfuricans | <1.5 | 2.5 |
| Clostridium sp. (from oilfield water) | <1.5 | 11 |

Example 5

In other tests substantially following the procedure of Example 4, except for substitution of oil well brine from California coastal oil well waterfloods identified as "Gaspur zone water" for the distilled water and sodium chloride, it was observed that growth of the bacteria was prevented at 2.2 p.p.m. of methylene bisthiocyanate and growth was held until 17 days at 1.1 p.p.m. of the same compound. In time kill tests using the same California oil well brine in place of distilled water and sodium chloride, the following results were recorded.

TABLE II.—ANAEROBIC CULTURE TUBES AT FOUR WEEKS

| Parts Per Million | Sulfate Reducing Bacteria | | Total Bacteria | |
|---|---|---|---|---|
|  | Colonies per ml. | Percent Kill | Colonies per ml. | Percent Kill |
| Media Blank | 0 |  | 0 |  |
| 0 | 200,000 |  | 1,000,000 |  |
| 0.6 | 100,000 | 50 | 1,000,000 | 0 |
| 1.1 | 90,000 | 55 | 800,000 | 20 |
| 2.2 | 70,000 | 65 | 800,000 | 20 |
| 3.4 | 20,000 | 90 | 700,000 | 30 |
| 4.5 | 10,000 | 95 | 500,000 | 50 |
| 5.6 | 3,000 | 99 | 400,000 | 60 |
| 8.4 | 1,000 | 99 | 400,000 | 60 |
| 11.2 | 60 | 99 | 10,000 | 99 |
| 28.0 | 0 | 100 | 5,000 | 99 |

It will be noted from the table that 99% kill was observed at about 5.6 p.p.m. of methylene bisthiocyanate.

I claim:
1. A method of inhibiting the growth of sulfate reducing bacteria which comprises contacting said bacteria with an effective amount of a compound selected from the group consisting of methylene bisthiocyanate and monohalomethyl thiocyanate.
2. A method of inhibiting the growth of sulfate reducing bacteria which comprises contacting said bacteria with an effective amount of methylene bisthiocyanate.
3. A method of inhibiting the growth of sulfate reducing bacteria which comprises contacting said bacteria with an effective amount of monohalomethyl thiocyanate.
4. A method of inhibiting the growth of sulfate reducing bacteria which comprises contacting said bacteria with an effective amount of monochloromethyl thiocyanate.
5. A method of inhibiting the growth of sulfate-reducing bacteria of the species Desulfovibrio which comprises contacting said bacteria with an effective amount of a compound selected from the group consisting of methylene bisthiocyanate and monohalomethyl thiocyanate.
6. A method of inhibiting the growth of sulfate-reducing bacteria of the species Desulfovibrio which comprises contacting said bacteria with an effective amount of methylene bisthiocyanate.
7. A method of inhibiting the growth of sulfate-reducing bacteria of the species Desulfovibrio which comprises contacting said bacteria with an effective amount of monohalomethyl thiocyanate.
8. A method of inhibiting the growth of sulfate-reducing bacteria of the species Desulfovibrio which comprises contacting said bacteria with an effective amount of monochloromethyl thiocyanate.

References Cited by the Examiner

UNITED STATES PATENTS 2,722,478   11/1955   Olin _____ 167—22

FOREIGN PATENTS 545,740   3/1932   Germany.
1,188,858   3/1965   Germany.

OTHER REFERENCES

Frobisher: Fundamentals of Microbiology, Seventh edition, published by W. B. Saunders Co., Philadelphia, 1962, pp. 18 and 32–34.

Hackh's Chemical Dictionary, Third edition, published by McGraw-Hill Book Co., New York, 1944, p. 360.

Marova et al.: Zhur. Priklad. Khim., vol. 30, pp. 650–652, 1957.

ELBERT L. ROBERTS, *Primary Examiner.*

RICHARD HUFF, *Assistant Examiner.*